O. G. RIESKE.
DISK ATTACHMENT FOR DRILLS.
APPLICATION FILED NOV. 28, 1910.
1,030,247.
Patented June 18, 1912.
3 SHEETS—SHEET 1.
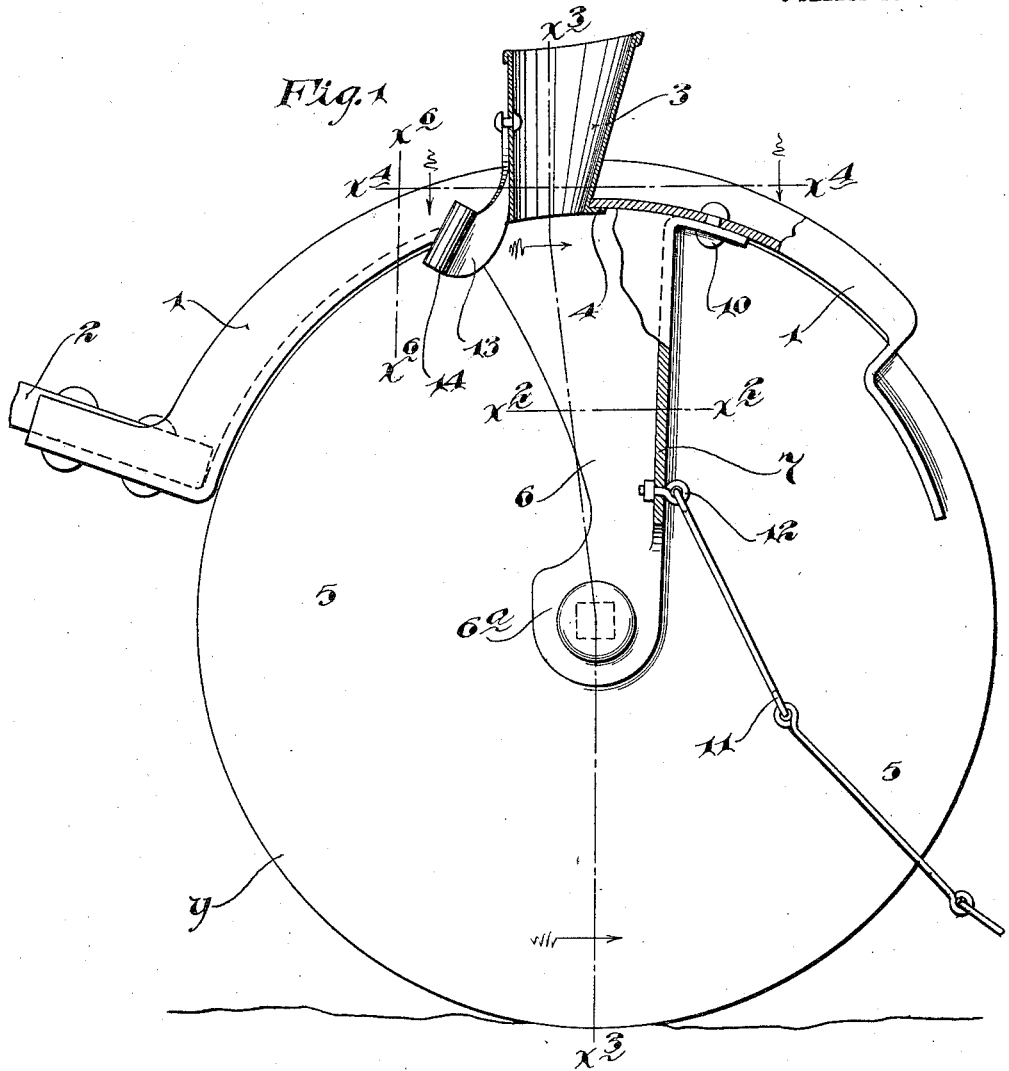
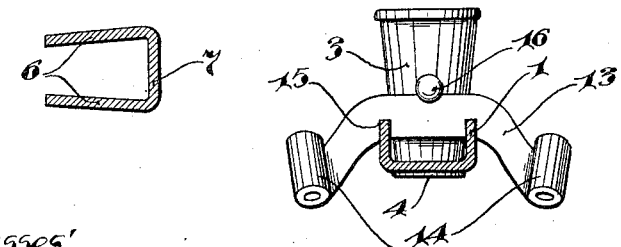
Witnesses:
E. C. Skinkle
W. H. Souba
Inventor:
Otto George Rieske
By his Attorneys,
Williamson Muchard

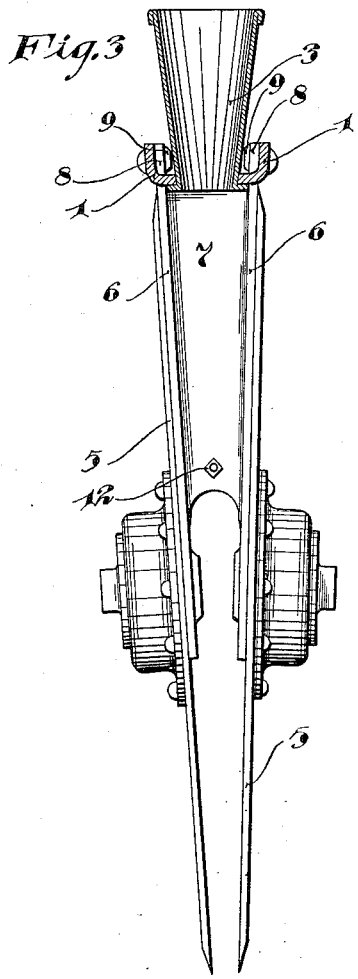
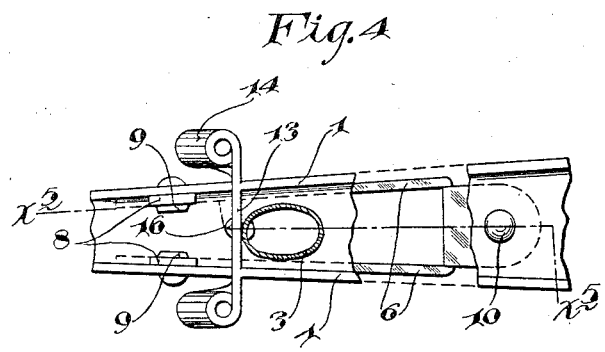
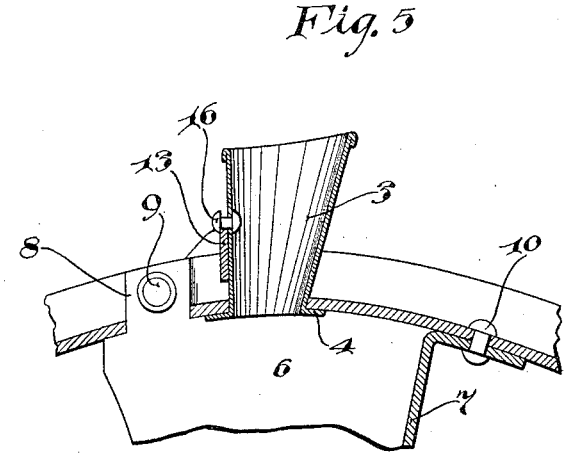

O. G. RIESKE.
DISK ATTACHMENT FOR DRILLS.
APPLICATION FILED NOV. 28, 1910.
1,030,247.
Patented June 18, 1912.
3 SHEETS—SHEET 3.
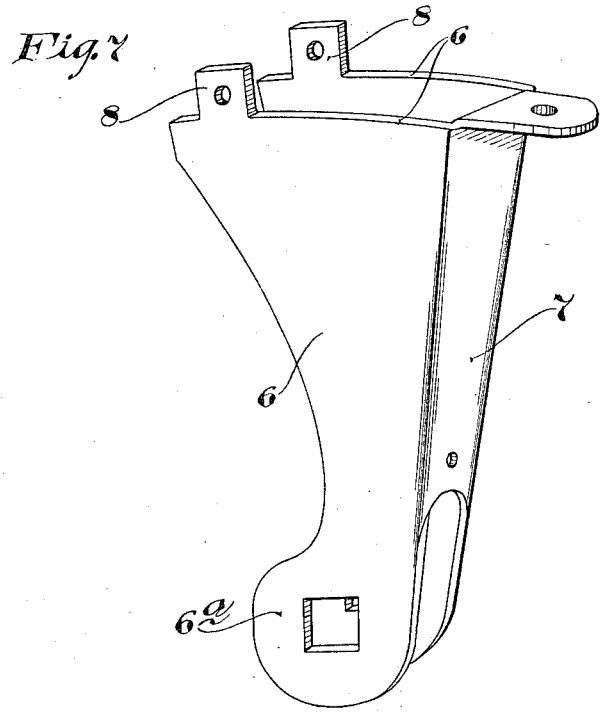
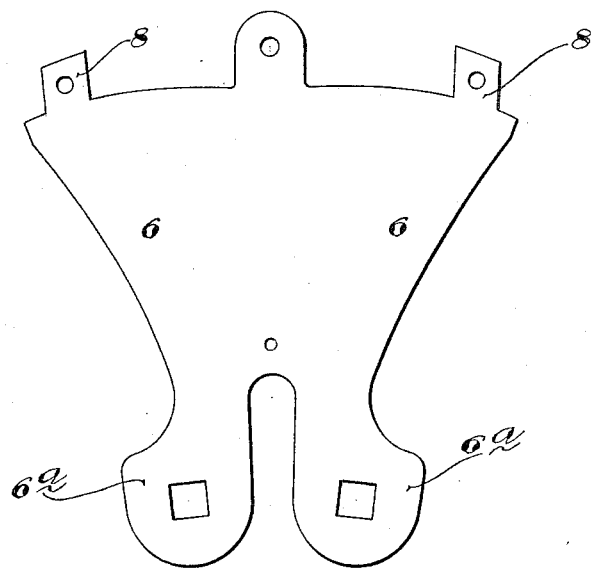
Witnesses:
E. C. Skinkle
W. H. Souba
Inventor:
Otto George Rieske
By his Attorneys;
Williamson Merchant

UNITED STATES PATENT OFFICE.

OTTO G. RIESKE, OF ST. LOUIS PARK, MINNESOTA, ASSIGNOR TO THE MONITOR DRILL COMPANY, OF ST. LOUIS PARK, MINNEAPOLIS, MINNESOTA, A CORPORATION OF MINNESOTA.

DISK ATTACHMENT FOR DRILLS.

1,030,247.     Specification of Letters Patent.     Patented June 18, 1912.

Application filed November 28, 1910. Serial No. 594,534.

*To all whom it may concern:*

Be it known that I, OTTO G. RIESKE, a citizen of the United States, residing at St. Louis Park, in the county of Hennepin and State of Minnesota, have invented certain new and useful Improvements in Disk Attachments for Drills; and I do hereby declare the following to be a full, clear, and exact description of the invention, such as will enable others skilled in the art to which it appertains to make and use the same.

My invention has for its object to provide an improved disk attachment for drills or seeding machines, and is in the nature of an improvement on or a modification of the device disclosed and claimed in my copending application No. 534,967, filed December 27, 1909, and in my pending application No. 571,917, filed July 14, 1910, and both entitled double disk attachment for drills.

The invention consists of the novel devices and combinations of devices hereinafter described and defined in the claims.

In the accompanying drawings which illustrate the invention, like characters indicate like parts throughout the several views.

Referring to the drawings; Figure 1 is a view partly in side elevation and partly in vertical section, showing the improved disk attachment; Fig. 2 is a detail in horizontal section taken on the line $x^2$ $x^2$ of Fig. 1; Fig. 3 is a vertical section taken approximately on the line $x^3$ $x^3$ of Fig. 1, some parts being left in full; Fig. 4 is a horizontal section taken on the line $x^4$ $x^4$ of Fig. 1, some parts being broken away; Fig. 5 is a vertical section taken on the irregular line $x^5$ $x^5$ of Fig. 4, some parts being broken away; Fig. 6 is a detail in vertical section taken on the line $x^6$ $x^6$ of Fig. 1; Fig. 7 is a prospective view showing in detail the leg structure of the seed boot; and, Fig. 8 shows the sheet metal section from which the boot leg is constructed as it appears after having been stamped and before it has been bent into form.

The arched main body portion 1 of the seed boot which is preferably stamped or drop forged from sheet steel, in cross section is made channel shape, and is tapered in width in a direction from its rear toward its front end. The flanges of the said channel shaped body 1 are progressively increased in height or depth in front of the boot legs, so as to compensate for the progressively narrowing of the channel shaped boot body and the increased strain imposed upon the front part of the said body. The extreme front end of the body 1 is turned radially outward and is riveted, or otherwise secured to the outer end of an ordinary drag bar 2.

The channel shape body 1, at its central and upper portion, is formed with a large perforation through which is passed a short and preferably tapered sheet metal spout 3, the small lower end of which is rolled or the said body 1. This retaining flange 4 and which directly engages the under surface of said body 1. This retaining flange 4 and the taper of the spout will serve to hold the said spout securely locked to the channel shaped shoe body 1, with the spout extended upward between the laterally spaced upturned flanges of the said shoe body.

The disks 5 which converge in the usual manner, preferably approximately from a point marked Y in Fig. 1, are journaled to laterally spaced legs 6, which legs, in accordance with one feature of my present invention, are preferably formed integral with a common connecting back plate 7. The laterally spaced legs 6 taper downwardly to a point in front of the lower portion of the back plate 7, and below the latter are increased in width to form leg portions $6^a$ to which the disks may be suitably journaled. These leg portions $6^a$, furthermore, preferably have sufficient spring, in the proper direction to yieldingly hold the disks 5 in contact at the point Y, and thereby compensate for irregularities in the surface of the disks and to the diminution of the size of the disks due to wear. If the said leg portion $6^a$ should not have this desired amount of spring tension, they may, from time to time, be bent by the application of a wrench, or other suitable tool, so as to maintain engagement with the disk when decreased in diameter by wear.

The legs 6 at the front portions of the upper edges are provided with lugs or projections 8 that are passed upward through slots formed in the web of the channel shape body over an area which extends both in flanges thereof by rivets 9. The upper edge of the tie plate 7 is turned backward and is rigidly secured to the web of the boot body 1 by a rivet 10. The laterally spaced legs 6 and tie plate sections 7 are thus very rigidly secured to the channel shaped boot body 1 and they afford a sort of downward continuation of the feed spout and assist in guiding the grain or seed to a proper point in the furrow. Also, the channel shaped leg structure is made very strong and the upper portion thereof is caused to very greatly reinforce the channel shape boot body over the area which extends both in front and to the rear of the perforation in the said boot body through which the spout 3 is passed. A drag chain 11 may be very conveniently attached to the lower portion of the plate section 7 by means of a small eye bolt 12. A so-called bridge bar 13, is extended across the top of the channel shape boot body 1, and bears against the front of the spout 3, with its ends bent downward and terminated in coiled portions 14, that afford sleeves, or sockets, to which outside scrapers, not shown, may be pivotally connected. This bridge bar has notches 15, in its inner edge that receive the notched upper edges of the upturned flanges of the channel shaped boot body 1, and thus the said bridge bar is interlocked to the flanges of the said boot body, against both endwise and lateral movements. To hold the said bridge bar thus interlocked with the flanges of the boot body, a rivet 16 is applied to the front of the spout 3, with its outer head overlapping the upper edge of the central portion of the said bridge bar. This bridge bar, therefore, performs a second function, to-wit, it reinforces the central portion of the channel shaped boot body, and the connection between the same and the feed spout 3. It may be here further stated, that while the disks 5 may be journaled to the legs 6 in various different ways, that the form of the journal preferably employed is that disclosed and claimed in my pending application No. 575,917, more fully identified above.

What I claim is:

1. In a double disk attachment, the combination with a channel-shaped boot body having a seed passage opening therethrough, of a channel-shaped leg structure secured to the said boot body at points both at the front and rear of said seed passage, thereby reinforcing said boot body, and disks journaled to the lower portion of said leg structure.

2. In a double disk attachment, the combination with a channel-shaped pressed metal boot body having a seed passage opening therethrough, of a channel shaped leg structure secured to said boot body at points both at the front and rear of said seed passage, thereby reinforcing said boot body, and disks journaled to the lower portion of said leg structure.

3. In a double disk attachment, the combination with a channel-shaped pressed sheet metal boot body having upwardly extended flanges and a seed passage opening therethrough, of a channel-shaped pressed sheet metal leg structure secured to said boot body at points both in front and rear of said seed passage and depending therefrom, and disks journaled to the lower portion of said leg structure.

4. A double disk attachment comprising a seed boot body having a seed passage opening therethrough, a channel shaped leg structure rigidly secured at its upper portion to said boot body in the vicinity of said seed passage and having laterally spaced leg portions at its lower extremity, and disks journaled to the said lower leg portions of said leg structure.

5. In a double disk attachment, the combination with a channel-shaped pressed metal boot body having upwardly projecting flanges and having a seed passage opening through its upper portions, of a channel shaped leg structure secured to said boot body and having its back cut away at the lower portion to afford laterally spaced depending legs, and converging disks journaled to the said depending legs.

6. In a double disk attachment, the combination with a channel shaped pressed steel boot body having upwardly extended flanges and a seed passage opening through its upper portion, of a channel-shaped pressed sheet metal leg structure, the upper end of which is provided at its back with a flange riveted to said boot body and at the front portion of its sides with flanges extended upward through the web of said boot body and riveted to the flanges thereof, and the back of said leg structure being cut away at its lower portion to afford laterally spaced depending legs, and converging disks journaled to the said legs.

7. A seed boot for disk drills, comprising a pressed channeled sheet metal boot body tapering in width in the direction from its rear toward its front end, and having the flanges of the channel on the upper side, and laterally spaced depending metal boot legs rigidly secured thereto at their upper ends, the flanges of the boot body being greater in depth in front of the boot legs than in the rear thereof, for strengthening the narrowed portion thereof.

8. In a double disk attachment, the combination with a channel shaped boot body having upwardly extended flanges, and a seed spout opening through the upper portion thereof, of a bridge piece secured to the flanges of said boot body immediately in front of said spout, substantially as described.

9. In a double disk attachment, the combination with a channel-shaped boot body having upwardly extended flanges, and a seed spout opening through the upper portion thereof, of a bridge piece secured to the flanges of said boot body immediately in front of said spout, the ends of said bridge piece being extended to afford bearings adapted to support scrapers.

10. In a double disk attachment, the combination with a channel shaped boot body having upwardly extended flanges, and a seed spout opening through the upper portion thereof, of a bridge piece secured to the flanges of said boot body immediately in front of said spout, the said bridge piece being rigidly secured to the flanges of said boot body and to the said spout reinforcing the connection between the two.

11. In a double disk attachment, the combination with a channel-shaped boot body having upwardly extended flanges, and a seed spout opening through the upper portion thereof, of a bridge piece secured to the flanges of said boot body immediately in front of said spout, the said bridge piece being rigidly secured to the flanges of said boot body and to the said spout reinforcing the connection between the two, and the ends of said bridge bar being bent to afford bearings adapted to support scrapers.

12. In a disk attachment, the combination with a channel-shaped pressed metal shoe having upwardly extended flanges, of a tapered seed spout extended through the web of said shoe and having its lower end flanged against said shoe to rigidly secure the said spout to said shoe.

13. In a double disk attachment, the combination with a boot body having a seed passage opening therethrough, of a channel-shaped leg structure having its upper portion secured to said boot body, and disks journaled to the lower portion of said leg structure.

14. In a double disk attachment, the combination with a boot body having a seed passage opening therethrough, of a channel-shaped leg structure, secured to the said boot body at points both at the front and rear of said seed passage, thereby reinforcing said boot body, and disks journaled to the lower portion of said leg structure.

In testimony whereof I affix my signature in presence of two witnesses.

OTTO G. RIESKE.

Witnesses:
HARRY D. KILGORE,
F. D. MERCHANT.

---

Copies of this patent may be obtained for five cents each, by addressing the "Commissioner of Patents, Washington, D. C."